3,157,580
FUEL ELEMENTS FOR NUCLEAR REACTORS
Donald Williams, Beckermet, Cumberland, England, assignor to United Kingdom Atomic Energy Authority, London, England
Filed Jan. 16, 1961, Ser. No. 82,879
Claims priority, application Great Britain Jan. 19, 1960
4 Claims. (Cl. 176—68)

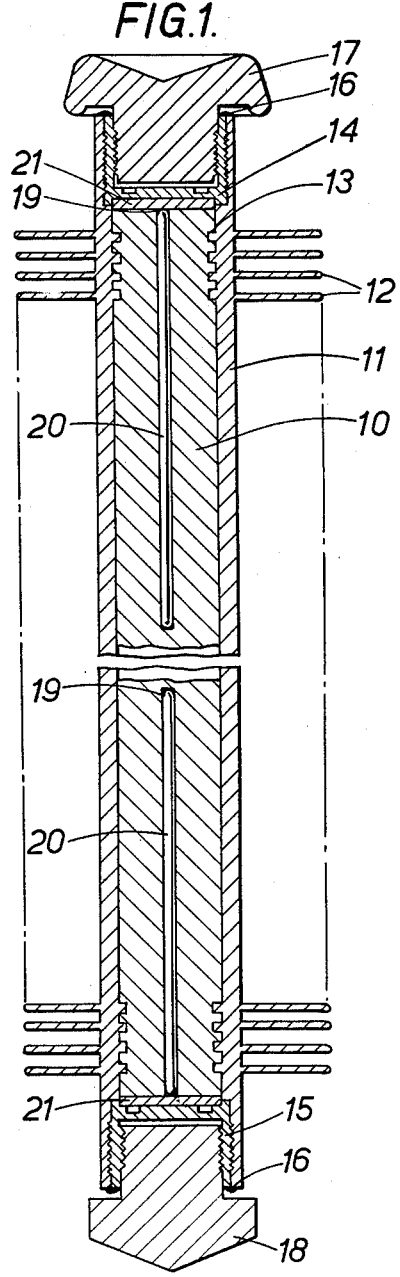
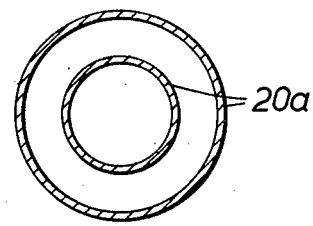
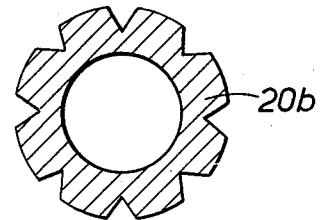

This invention relates to fuel elements for nuclear reactors and is concerned with fuel elements of the kind in which a solid nuclear fuel member is enclosed in a protective sheath.

A fuel element of the kind described may fail during operation in a carbon dioxide-cooled nuclear reactor because a leak develops through the protective sheath and this leak allows coolant gas to attack the fuel member, causing a mound of oxide to form on the fuel member so that the sheath bursts and the fuel element channel in the reactor is contaminated. This would eventually lead to contamination of the whole coolant circuit and make maintenance hazardous. It would also make it difficult to detect subsequent leaks with the conventional apparatus in which samples of coolant gas from each channel are monitored in turn for the presence of short-lived fission products escaping through leaks in the protective sheath. It is therefore desirable that early warning of a leak should be given to the reactor operator so that the faulty fuel element can be discharged before the sheath bursts. However, inleaking coolant sometimes limits out-leakage of fission products so that they have decayed below a detectable level before reaching the monitoring apparatus and it is an object of the invention to provide means for increasing the signal at the monitoring apparatus when oxide builds up on a fuel member.

According to the present invention a fuel element comprising a nuclear fuel member enclosed in a protective sheath has a capsule containing radioactive gas disposed within the fuel member.

The material of the capsule is selected so that it melts and releases the radioactive gas when the safe working temperature of the fuel member is exceeded. If a fuel element according to the invention should develop a leak so that coolant gains access to the fuel member and oxidises the member, the insulating effect of the oxide formed causes the temperature of the fuel member to rise and on the fuel member reaching the melting point of the capsule leads to release of the radioactive gas. The pressure of this gas temporarily overcomes the pressure of coolant diffusing in through the leak and a pulse of fission product activity (due to the radioactive gas and the fission products it takes out with it) is indicated on the fuel element monitoring apparatus, warning the reactor operator of a leak.

By way of example an embodiment of the invention will now be described with reference to the accompanying drawings wherein FIG. 1 is a side view in medial section and FIGS. 2 and 3 are cross sections on an enlarged scale.

In FIG. 1 is shown a nuclear reactor fuel element comprising a uranium fuel member 10 enclosed in a protective sheath 11 having circumferential fins 12. The sheath 11 is pressurized into grooves 13 on the fuel member 10 and is provided with end caps 14, 15 screw threaded into the main part of the sheath 11 then welded by edge welds 16. The end cap 14 carries a cup-shaped locating member 17 and the end cap 15 carries a cone-shaped locating member 18. At each end of the fuel member 10 is a bore 19 containing a capsule 20 of magnesium alloy, filled with krypton 85 gas. The capsules 20 are a close fit in the bores 19 which are closed off by spacer discs 21 of insulating material placed beneath the end caps 14, 15. In a fuel member about one inch in diameter and between three and four feet long a bore at each end of the member ¼" in diameter and four inches in length is considered suitable if the protective sheath is sealed by end-caps, as leakage not detected in the normal manner by outflow of fission products is most likely to occur between the end caps and the main part of the sheath. Capsules may, however, extend the whole length of the fuel element and this is advisable if the fuel member is hollow.

The capsules may be simple smooth surfaced cylinders with rounded ends as shown in FIG. 1. Alternatively, a tubular capsule 20a as shown in FIG. 2 or a capsule 20b as shown in FIG. 3, grooved along its whole length, may be employed. With the tubular capsule 20a it is sometimes convenient to use a number of separate tubes. The shapes in FIGS. 2 and 3 provide leads for gas escaping from a melting capsule whilst exposing only a limited area of uranium in the bores 19.

The capsules are filled with radioactive gas at a pressure such that at the melting point of the capsules the pressure of the radioactive gas in the capsule is greater than the reactor coolant pressure.

Instead of krypton 85 as the radioactive gas radon may be used.

I claim:

1. A fuel element comprising a nuclear fuel member enclosed in a protective sheath and having a capsule containing radioactive gas disposed within the fuel member, said capsule being made of a magnesium alloy having a melting temperature below the safe working temperature of the fuel member.

2. A fuel element according to claim 1 wherein the radioactive gas is krypton 85.

3. A fuel element according to claim 1 wherein the capsule is tubular.

4. A fuel element according to claim 1 wherein on the outer surface of the capsule, grooves are defined extending the length of the capsule.

References Cited in the file of this patent
UNITED STATES PATENTS

| | | |
|---|---|---|
| 2,716,229 | Wehrmann et al. | Aug. 23, 1955 |
| 2,777,812 | Powell et al. | Jan. 15, 1957 |
| 2,855,355 | Ohlinger et al. | Oct. 7, 1958 |
| 2,873,853 | Burton | Feb. 17, 1959 |
| 2,987,455 | Huston et al. | June 6, 1961 |
| 3,037,924 | Creutz | June 5, 1962 |

FOREIGN PATENTS

| | | |
|---|---|---|
| 819,366 | Great Britain | Sept. 2, 1959 |

OTHER REFERENCES

Atomic World (vol. 10, No. 2), February 1959, pages 56–57.

Nuclear Power, July 1959, pages 77–79.